United States Patent
Jin et al.

(10) Patent No.: US 12,062,751 B2
(45) Date of Patent: Aug. 13, 2024

(54) REUSABLE POUCH TYPE SECONDARY BATTERY, BATTERY MODULE COMPRISING THE SAME AND METHOD OF REUSING BATTERY MODULE

(71) Applicant: LG ENERGY SOLUTION, LTD., Seoul (KR)

(72) Inventors: Hee-Jun Jin, Daejeon (KR); Sung-Won Seo, Daejeon (KR); Yoon-Koo Lee, Daejeon (KR); Eun-Ah Ju, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/113,780

(22) Filed: Feb. 24, 2023

(65) Prior Publication Data
US 2023/0207861 A1 Jun. 29, 2023

Related U.S. Application Data

(62) Division of application No. 17/741,767, filed on May 11, 2022, now Pat. No. 11,616,250, which is a
(Continued)

(30) Foreign Application Priority Data

Apr. 25, 2017 (KR) .................. 10-2017-0052906

(51) Int. Cl.
*H01M 10/04* (2006.01)
*H01M 50/105* (2021.01)
(Continued)

(52) U.S. Cl.
CPC ....... *H01M 10/045* (2013.01); *H01M 50/105* (2021.01); *H01M 50/119* (2021.01);
(Continued)

(58) Field of Classification Search
CPC .. H01M 10/045; H01M 50/50; H01M 50/124; H01M 50/548; H01M 50/516;
(Continued)

(56) References Cited

U.S. PATENT DOCUMENTS

| 6,743,546 B1 | 6/2004 | Kaneda et al. |
| 2008/0102362 A1 | 5/2008 | Nii et al. |

(Continued)

FOREIGN PATENT DOCUMENTS

| CN | 1348677 A | 5/2002 |
| CN | 101877413 A | 11/2010 |

(Continued)

OTHER PUBLICATIONS

European Search Report for Appl. No. 18791492.4 dated Feb. 4, 2020.
(Continued)

*Primary Examiner* — Jimmy Vo
(74) *Attorney, Agent, or Firm* — Birch, Stewart, Kolasch & Birch, LLP

(57) ABSTRACT

A pouch type secondary battery in which an electrode lead of the pouch type secondary battery and an electrode lead of an adjacent different pouch type secondary battery are welded together to construct a battery module is provided. The electrode lead of the pouch type secondary battery includes a length extended part so that, after cutting a welded part of the electrode leads of the pouch type secondary battery and the adjacent different pouch type secondary battery to form electrode leads of remaining length, the electrode leads of remaining length are welded together again. A battery module and method of reusing the battery module are also provided.

5 Claims, 11 Drawing Sheets

Related U.S. Application Data division of application No. 16/338,228, filed as application No. PCT/KR2018/002006 on Feb. 19, 2018, now Pat. No. 11,362,389.

(51) Int. Cl.
*H01M 50/119* (2021.01)
*H01M 50/124* (2021.01)
*H01M 50/178* (2021.01)
*H01M 50/211* (2021.01)
*H01M 50/50* (2021.01)
*H01M 50/516* (2021.01)
*H01M 50/533* (2021.01)
*H01M 50/548* (2021.01)
*H01M 50/553* (2021.01)

(52) U.S. Cl.
CPC ....... *H01M 50/124* (2021.01); *H01M 50/178* (2021.01); *H01M 50/211* (2021.01); *H01M 50/50* (2021.01); *H01M 50/516* (2021.01); *H01M 50/533* (2021.01); *H01M 50/548* (2021.01); *H01M 50/553* (2021.01); *H01M 2220/20* (2013.01)

(58) Field of Classification Search
CPC ............ H01M 50/178; H01M 50/105; H01M 50/533; H01M 50/211; H01M 50/119; H01M 50/553
See application file for complete search history.

(56) References Cited

U.S. PATENT DOCUMENTS

| | | | |
|---|---|---|---|
| 2008/0268344 A1* | 10/2008 | Kim | H01M 50/55 429/246 |
| 2012/0094161 A1 | 4/2012 | Zheng | |
| 2013/0045402 A1* | 2/2013 | Takahashi | H01M 50/557 429/162 |
| 2013/0330595 A1 | 12/2013 | Lee et al. | |
| 2014/0045049 A1 | 2/2014 | Iyori et al. | |
| 2014/0293511 A1 | 10/2014 | Mori et al. | |
| 2014/0335397 A1 | 11/2014 | Yang et al. | |
| 2014/0370356 A1 | 12/2014 | Yi | |
| 2015/0162593 A1 | 6/2015 | Lee | |
| 2016/0079574 A1 | 3/2016 | Song et al. | |
| 2017/0005302 A1 | 1/2017 | Muroi | |
| 2017/0018756 A1 | 1/2017 | Kim et al. | |

FOREIGN PATENT DOCUMENTS

| | | | |
|---|---|---|---|
| CN | 105428691 A | 3/2016 | |
| CN | 104094448 B | 8/2016 | |
| DE | 10 2010 031 457 A1 | 1/2012 | |
| EP | 1 988 588 A1 | 11/2008 | |
| JP | 3602797 B2 | 12/2004 | |
| JP | 2005-44583 A | 2/2005 | |
| JP | 2008-108584 A | 5/2008 | |
| JP | 2010-251085 A | 11/2010 | |
| JP | 2011-9096 A | 1/2011 | |
| JP | 2014-110219 A | 6/2014 | |
| KR | 10-2012-0121346 | 11/2012 | |
| KR | 10-2014-0026104 A | 3/2014 | |
| KR | 10-1500229 B1 | 3/2015 | |
| KR | 10-2015-0054202 A | 5/2015 | |
| KR | 10-2016-0040859 A | 4/2016 | |
| KR | 10-2016-0079294 A | 7/2016 | |
| KR | 10-2016-0134331 A | 11/2016 | |
| KR | 10-2017-0034560 A | 3/2017 | |
| WO | WO-2008137178 A1 * | 11/2008 | ........ H01M 8/04201 |

OTHER PUBLICATIONS

International Search Report (PCT/ISA/210) issued in PCT/KR2018/002006, mailed on Jun. 5, 2018.

* cited by examiner

REUSABLE POUCH TYPE SECONDARY BATTERY, BATTERY MODULE COMPRISING THE SAME AND METHOD OF REUSING BATTERY MODULE

CROSS-REFERENCE TO RELATED APPLICATION

The present application is a divisional of U.S. application Ser. No. 17/741,767, filed on May 11, 2022, which is a divisional of U.S. application Ser. No. 16/338,228, filed on Mar. 29, 2019 (now U.S. Pat. No. 11,362,389, issued on Jun. 14, 2022), which is a national phase entry under 35 U.S.C. § 371 of International Patent Application No. PCT/KR2018/002006, filed on Feb. 19, 2018, which claims priority from Korean Patent Application No. 10-2017-0052906, filed on Apr. 25, 2017, the disclosures of which are hereby incorporated herein by reference in their entireties.

TECHNICAL FIELD

The present disclosure relates to a pouch type secondary battery, and more particularly, to a reusable pouch type secondary battery and a battery module comprising the same.

BACKGROUND ART

Recently, with the dramatically increasing demand for portable electronic products such as laptop computers, video cameras, mobile phones, and the like, along with the active development of electric vehicles, accumulators for energy storage, robots, satellites, and the like, many studies of high-performance secondary batteries capable of repeatedly recharging has been conducted. Currently, among commercially available secondary batteries, lithium secondary batteries have little or no memory effect, and thus they are gaining more attention than nickel-based secondary batteries for their advantages of free charging/discharging, low self-discharging, and high energy density.

More recently, secondary batteries are being widely used in not only small devices such as portable electronic products but also medium- and large-scale devices such as vehicles and energy storage systems (ESSs). In particular, with the steady exhaustion of carbon energy and increasing interest in the environment, the demand for hybrid electric vehicles and electric vehicles is increasing all over the world including United States, Europe, Japan, and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing.

When a secondary battery is used for an electric vehicle, to increase the capacity and output, a battery pack is manufactured using battery modules in which many secondary batteries are connected in series and/or in parallel. In this instance, pouch type secondary batteries are widely used in medium- and large-scale devices because they are easy to stack.

FIG. 1 shows a general pouch type secondary battery. Referring to FIG. 1, the general pouch type secondary battery 1 has a sealing part 30 formed by sealing a pouch case 10 in which an electrode assembly 20 is received, and electrode leads 40, 45 are welded to a positive electrode tab and a negative electrode tab of the electrode assembly 20 respectively and exposed through the pouch case 10. A lead film 50 is interposed between the pouch case 10 and the electrode leads 40, 45. In the sealing part 30, particularly, a portion where the electrode leads 40, 45 are drawn is called terrace T.

As shown in FIG. 2, a plurality of pouch type secondary batteries 1 is stacked, and two adjacent pouch type secondary batteries 1 are connected in series and/or in parallel such that the electrode leads 40, 45 provided in each pouch type secondary battery 1 are connected to each other to construct a battery module 11 with improved capacity and output. The reference numeral 60 is a structure that structurally supports the battery module 11, such as a molded product.

When connecting the pouch type secondary batteries 1 to manufacture the battery module 11, laser welding L is applied to connect the electrode leads 40, 45. The battery module 11 is used for an automobile battery, and after the intended service life expires, it would be desirable that the battery module 11 is used for a second purpose, for example, an ESS having less strict capacity retention rate or other conditions. To this end, it is necessary to disassemble the existing connection structure of the first battery module and connect the pouch type secondary batteries by a different method to manufacture a new battery module for the purpose of reuse. However, conventionally, it was not easy to reuse because it was impossible to separate the electrode leads 40, 45 joined by laser welding L using a non-destructive method.

As in FIG. 3, when a welded part A formed by laser welding L is cut along a line C, the remaining electrode leads 40', 45' are too short. By this reason, it is impossible to reuse by reconnection and welding only using the remaining electrode leads 40', 45'.

As described above, conventionally, when disassembling a battery module and reusing pouch type secondary batteries for a new battery module, insufficient electrode lead length is problematic.

DISCLOSURE

Technical Problem

The present disclosure is designed to solve the above-described problem, and therefore the present disclosure is directed to providing a reusable pouch type secondary battery.

The present disclosure is further directed to providing a reusable battery module.

The present disclosure is further directed to providing a method of reusing a battery module.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, a pouch type secondary battery according to the present disclosure is a pouch type secondary battery in which an electrode lead of the pouch type secondary battery and an electrode lead of an adjacent different pouch type secondary battery are welded together to construct a battery module, and the electrode lead of the pouch type secondary battery includes a length extended part so that, after cutting a welded part of the electrode leads of the pouch type secondary battery and the adjacent different pouch type secondary battery to form electrode leads of remaining length, the electrode leads of remaining length are welded together again.

According to an embodiment of the present disclosure, the pouch type secondary battery has a lead film between a pouch case and the electrode lead, and the lead film may include a surplus part so that the lead film is formed to the length extended part. In this instance, the lead film may include a notch on two sides of a part of the lead film sticking out of the pouch case, the notches may be arranged to make the surplus part removable from the length extended part.

According to another embodiment of the present disclosure, the pouch type secondary battery further includes an insulation tape that covers the length extended part. The insulation tape may be a composite film in which a PI or PP film has an adhesive layer.

To achieve another object, a battery module according to the present disclosure includes the pouch type secondary battery.

The battery module according to the present disclosure includes a plurality of stacked pouch type secondary batteries, each pouch type secondary battery having an electrode lead including a length extended part, so that, after cutting a welded part of electrode leads of adjacently pouch type secondary batteries to form electrode leads of remaining length, the electrode leads of remaining length are welded together again.

According to another embodiment of the present disclosure, each pouch type secondary battery includes a terrace, and the electrode lead of the pouch type secondary battery included in the battery module is folded into the terrace of the pouch type secondary battery. The battery module may further include another insulation tape on a part where the electrode lead is folded.

To achieve still another object, a method of reusing a battery module according to the present disclosure is a method of reusing the battery module according to the present disclosure.

An embodiment of the method of reusing a battery module according to the present disclosure is a method of reusing a battery module, in which a plurality of pouch type secondary batteries is stacked, each pouch type secondary battery having an electrode lead including a length extended part, so that each electrode lead is capable of being cut after being welded to an adjacent electrode lead to form electrode leads of remaining length, and the electrode leads of adjacent pouch type secondary batteries are welded together to form a welded part, the reuse method including cutting the welded part of the battery module, and rearranging the pouch type secondary batteries and welding the electrode leads of remaining length together to manufacture another battery module.

When each pouch type secondary battery has a lead film between a pouch case and the electrode lead, the lead film includes a surplus part so that the lead film is formed to the length extended part, and the lead film includes a notch on two sides of a part of the lead film sticking out of the pouch case, the notches being arranged to make the surplus part removable from the long extended part, the reuse method may further include removing the surplus part before or after cutting the welded part of the battery module.

When each pouch type secondary battery further includes an insulation tape that covers the length extended part, the reuse method may further include removing the insulation tape before or after cutting the welded part of the battery module.

Another embodiment of a method of reusing a battery module according to the present disclosure is a method of reusing a battery module, in which a plurality of pouch type secondary batteries is stacked, each pouch type secondary battery having a terrace and an electrode lead including a length extended part, so that each electrode lead is capable of being cut after being welded to an adjacent electrode lead to form electrode leads of remaining length, each electrode leads is folded into the terrace of the pouch type secondary battery, and the electrode leads are welded together to form a welded part, the reuse method including cutting the welded part of the battery module, unfolding the folded electrode leads, and rearranging the pouch type secondary batteries and welding the unfolded electrode leads together to manufacture another battery module.

Further, the present disclosure proposes a method of reusing a general battery module. The reuse method is a method of reusing a battery module, in which a plurality of pouch type secondary batteries are stacked and electrode leads of adjacent pouch type secondary batteries are welded together, the reuse method including cutting the welded part of the electrode leads to form electrode leads of remaining length, welding additional leads for electrode lead length extension to the electrode leads of remaining length, respectively, and rearranging the pouch type secondary batteries and welding the additional leads together to manufacture another battery module.

Here, the step of welding additional leads for electrode lead length extension to the remaining electrode leads respectively is preferably performed by friction stir welding.

Advantageous Effects

According to the present disclosure, by solving the insufficient electrode lead length problem when reusing pouch type secondary batteries, a battery module of a new connection structure may be constructed, no matter which connection structure is series or parallel.

According to an aspect of the present disclosure, it is possible to reuse the battery module through structure modification to increase the electrode lead length of the pouch type secondary batteries. Because the remaining electrode lead length after cutting the joined part by laser welding is enough long, the pouch type secondary batteries may be used for a second purpose after connected again.

According to another aspect of the present disclosure, it is possible to reuse a battery module including conventional pouch type secondary batteries by joining additional leads to the battery module to extend the electrode lead length, the battery module may be reused.

According to still another aspect of the present disclosure, while the electrode lead length of the pouch type secondary batteries is increased, the electrode leads are folded for space utilization. The battery module may be reused for a second purpose, for example, an ESS, by unfolding the folded electrode leads and changing the series/parallel connection structure of the pouch type secondary batteries.

As above, according to the present disclosure, it is easy to reuse a battery module including pouch type secondary batteries, contributing to the utilization of limited resources and maximizing cost efficiency.

BRIEF DESCRIPTION OF THE DRAWINGS

The accompanying drawings illustrate preferred embodiments of the present disclosure and together with the following detailed description, serve to provide further understanding of the technical aspects of the present disclosure, and thus, the present disclosure should not be construed as being limited to the drawings.

MODE FOR CARRYING OUT THE INVENTION

Figure 1:
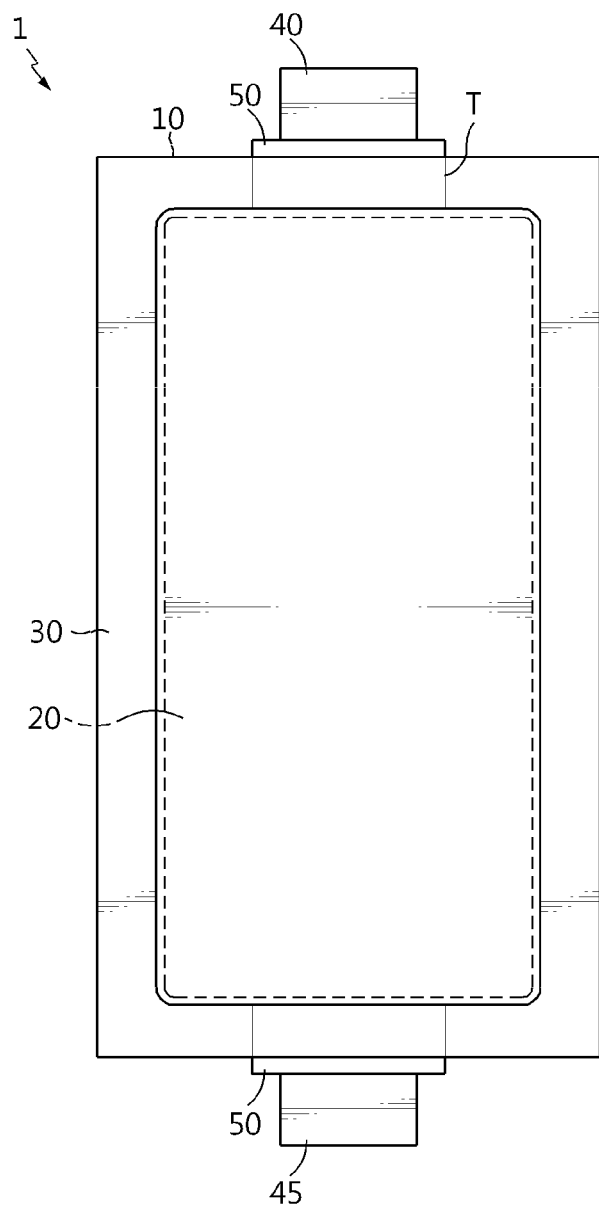
FIG. 1 is a schematic diagram showing a general pouch type secondary battery.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

Figure 4:
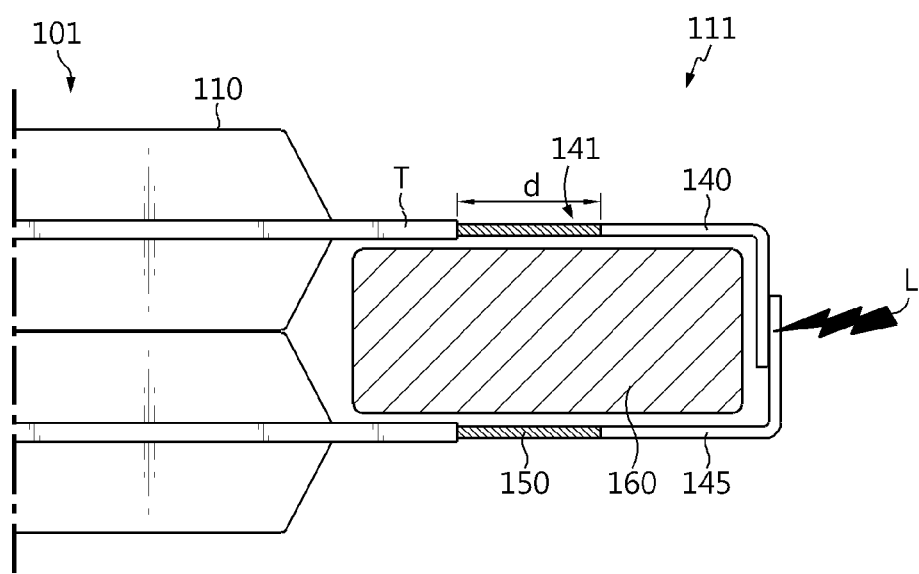
FIG. 4 is a side view of a battery module including pouch type secondary batteries according to an embodiment of the present disclosure.

FIG. 4 is a side view of a battery module including pouch type secondary batteries according to an embodiment of the present disclosure.

Referring to FIG. 4, a plurality of pouch type secondary batteries 101 is stacked, and two adjacent pouch type secondary batteries 101 are connected in series and/or in parallel such that electrode leads 140, 145 provided in each pouch type secondary battery 101 are connected to each other to construct a battery module 111. The reference numeral 160 is a structure that structurally supports the battery module 111, such as a molded product, and the reference numeral 150 is a lead film. The outline of the pouch type secondary battery 101 is similar to that of the pouch type secondary battery 1 of FIG. 1, and an electrode assembly is received in a pouch case 110 and sealed to form a sealing part, and the electrode leads 140, 145 are each welded to the positive electrode tab and the negative electrode tab of the electrode assembly and exposed through the pouch case 110. The lead film 150 is interposed between the pouch case 110 and the electrode lead 140, 145. A portion where the electrode leads 140, 145 are drawn is called terrace T.

The electrode leads 140, 145 have the increased length compared to the electrode leads 40, 45 of the conventional pouch type secondary battery 1 described with reference to FIGS. 1 to 3. The electrode leads 140, 145 include a length extended part 141 so that the electrode leads of the remaining length after cutting a welded part A of the electrode leads 140, 145 can be welded again. The size d of the length extended part 141 may be determined, taking into account a length that is discarded when cutting the welded part and a length and processing allowance required when newly welding, and when a currently used welder and the structure of the pouch type secondary battery are taken into account, preferably the size of the length extended part 141 is approximately 7 mm or more. When the length extended part d is smaller than 7 mm or less, there is difficulty in aligning the welder to weld the remaining parts after cutting the electrode leads 140, 145. When the length extended part 141 is too large, the spatial volume of the battery module 111 increases due to the electrode leads 140, 145, and when the energy density is considered, it is unfavorable. In view of this circumstance, the size d of the length extended part 141 is preferably 8 mm or more and 15 mm or less.

The pouch type secondary battery 101 according to an embodiment of the present disclosure has the increased length of the electrode leads 140, 145 compared to the conventional one, so that after use of the battery module 111, the pouch type secondary batteries 101 can be connected and reused by welding the remaining electrode lead parts after cutting the welded part A of the electrode leads 140, 145. As described above, the present disclosure proposes manufacturing the pouch type secondary battery 101 with the increased length of the electrode leads 140, 145 compared to the conventional one, stacking the pouch type secondary batteries 101, bending each electrode lead 140, 145, and joining the electrode leads 140, 145 by laser welding L to manufacture the battery module 111. That is, the battery module 111 according to the present disclosure is manufactured by stacking the plurality of pouch type secondary batteries 101 having the electrode leads 140, 145 including the length extended part 141 so that the electrode leads of the remaining length after cutting the welded part A of the electrode leads 140, 145 can be welded again, and welding the electrode leads 140, 145 of adjacent pouch type secondary batteries 101.

Because of including the length extended part 141, the battery module with the increased length of the electrode leads 140, 145 compared to the conventional one has a short circuit problem in the event of unwanted contact between the electrode leads 140, 145 with the increased length. The present disclosure ensures insulation by increasing the length of the insulating film 150 to cover the length extended part 141.

Figure 5:
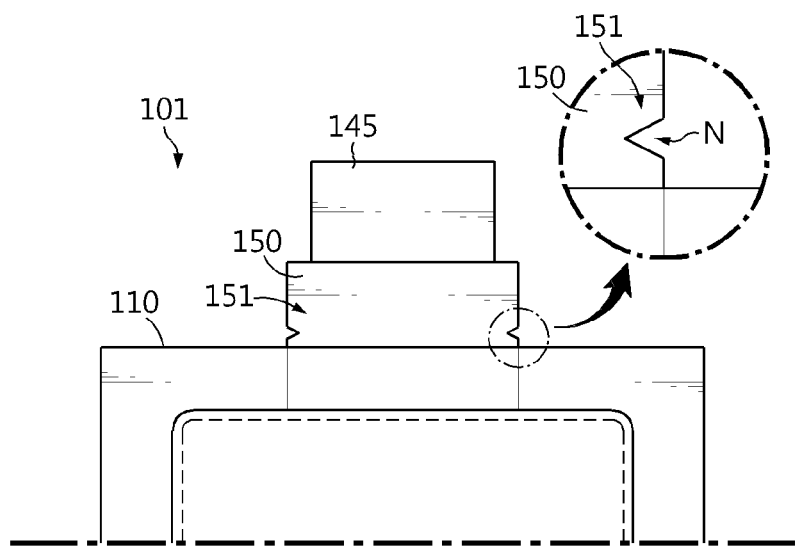
FIG. 5 is a top view of a pouch type secondary battery according to an embodiment of the present disclosure.

FIG. 5 is a top view of the pouch type secondary battery according to an embodiment of the present disclosure.

To solve the insulation problem encountered when using the battery module 111 due to the electrode leads 140, 145 with the increased length, a surplus part 151 may be formed by increasing the length of the lead film 150 extending out from the pouch case 110 of the pouch type secondary battery 101. The surplus part 151 may cover the length extended part 141. That is, an increase in the area in which the electrode leads 140, 145 are covered by the lead film 150 ensures insulation. After the battery module 111 is used, the surplus part 151 may be removed. To easily remove the surplus part 151, a notch N may be formed on two sides of the lead film 150. Instead of the notch N, a perforated line may be formed by punching, or a cutout corresponding to the perforated line may be formed beforehand.

A plurality of notches N may be formed as shown, and only one notch N may be formed. The notch N may be in semicircular, circular, U or V shape. The notch N may be included in two sides of the lead film 150 extending out from the pouch case 110.

The lead film 150 may prevent a short circuit from occurring between the electrode lead 140, 145 and a metal layer of the pouch case 110, as well as improving the sealing of the pouch case 110. In the heat welding of the electrode leads 140, 145 made of metal and the pouch case 110 made of polymer, the contact resistance is somewhat large, causing the surface contact to reduce. However, as in the above embodiment, with the lead film 150, this contact reduction phenomenon may be prevented. Additionally, it is preferred that the lead film 150 is made of an insulating material to prevent the application of the current from the electrode leads 140, 145 to the pouch case 110. The lead film 150 is formed of a film with insulation and heat weldability. The lead film 150 may be formed of, for example, a layer (a single layer or a multiple layer) of at least one material selected from polyimide (PI), polypropylene (PP), polyethylene (PE) and polyethylene terephthalate (PET). In this embodiment, the lead film 150 serves to prevent a short circuit in exposed parts of the electrode leads 140, 145 through the pouch case 110 by increasing the length of the lead film 150.

The pouch type secondary battery 101 according to an embodiment of the present disclosure has an increase in the length of the electrode leads 140, 145 and the length of the lead film 150, taking into account a length that is cut and removed when reusing and a length of a part to be additionally welded, and the reusable battery module 111 includes the pouch type secondary battery 101.

Figure 6:
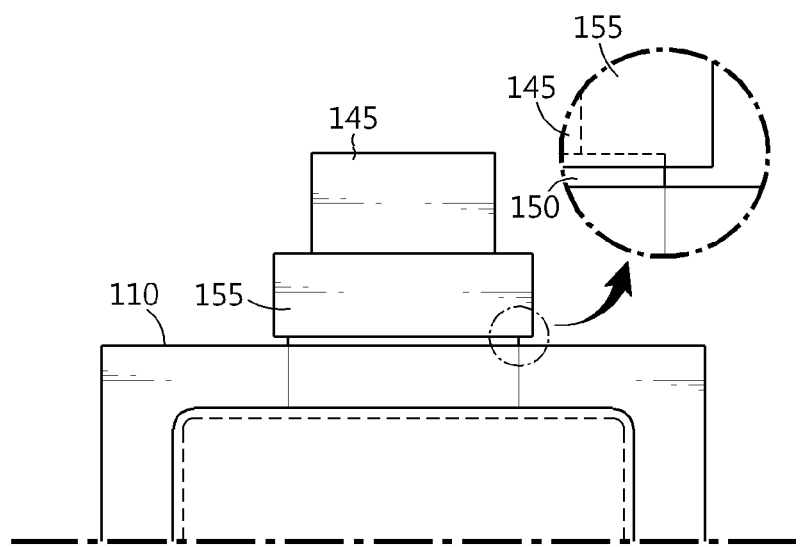
FIG. 6 is a top view of a pouch type secondary battery according to another embodiment of the present disclosure.

FIG. 6 is a top view of the pouch type secondary battery according to another embodiment of the present disclosure.

Referring to FIG. 6, an additional insulation tape 155 is attached onto the lead film 150 or the electrode leads 140, 145 extending out from the pouch case 110 of the pouch type secondary battery, ensuring insulation of the electrode leads 140, 145 with the increased length. The insulation tape 155 may cover the length extended part 141. Additionally, the insulation tape 155 may be PI or PP. Specifically, the insulation tape 155 may be a composite film in which a PI or PP film has an adhesive layer such as an epoxy adhesive. The additional insulation tape 155 provides an additional insulating portion to prevent a potential insulation problem caused by the long electrode leads 140, 145. After use of the battery module 111, the insulation tape 155 (and even a surplus part if the lead film has the surplus part) may be removed. The insulation tape 155 may be removed from the electrode leads 140, 145 through a simple operation of peeling off.

Figure 7:
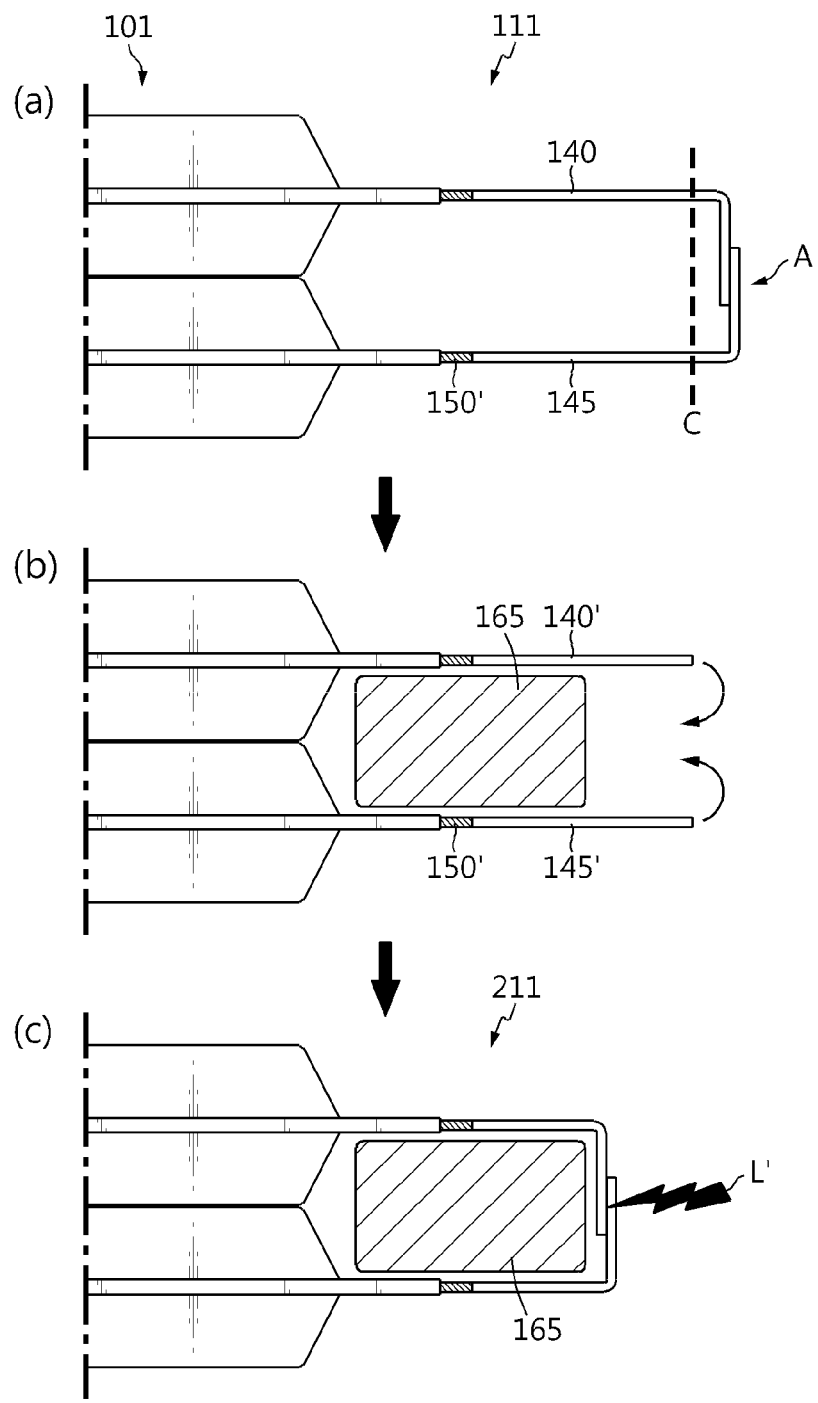
FIG. 7 is a side view illustrating a method of reusing a battery module including the pouch type secondary batteries shown in FIG. 5.
Figure 8:
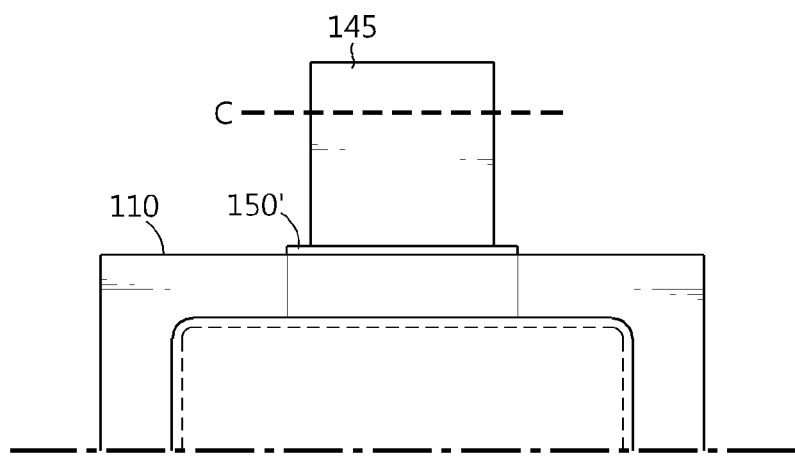
FIG. 8 is a top view showing preparation before step (a) in FIG. 7.

FIG. 7 is a side view illustrating a method of reusing a battery module including the pouch type secondary batteries shown in FIG. 5. FIG. 8 is a top view showing preparation before step (a) in FIG. 7.

The battery module 111 has a wide range of applications, and for example, may be used as a power source for at least one medium- and large-scale device of power tools; electric cars including electric vehicles (EVs), hybrid electric vehicles (HEVs), and plug-in hybrid electric vehicles (PHEVs); electric truck; electric commercial vehicles; and energy storage systems. After the service life expires after use as intended, the battery module 111 may be reused through the reuse method according to the present disclosure.

Referring to FIG. 7, for reuse, first, the welded part A of the electrode leads 140, 145 is cut along a line C from the conventional battery module 111 as shown in (a). In this instance, it may start with preparation shown in FIG. 8. That is, the surplus part 151 described in FIG. 5 or the insulation tape 155 described in FIG. 6 is removed first, leaving a lead film 150' extending out from the pouch case 110 as much as a normal length, and then step (a) of FIG. 7 may be performed. The step of removing the surplus part 151 described in FIG. 5 or the insulation tape 155 described in FIG. 6 may be performed before or after step (a) or (b) of FIG. 7.

After the welded part A is cut as shown in (a) of FIG. 7, the pouch type secondary batteries 101 are re-arranged as shown in (b), and as shown in (c), the remaining electrode leads 140', 145' are newly welded L' to each other to manufacture a different, new battery module 211. Specifically, after the remaining electrode leads 140', 145' are used as they are and a new structure 165 is placed, the remaining electrode leads 140', 145' are bent and welding L' is performed with the bent parts brought into contact. Then, the pouch type secondary batteries 101 may be re-arranged and re-constructed for reuse as a new battery module 211.

Meanwhile, when the length of the electrode leads increases as described in FIG. 4, the space occupied by the electrode leads in the battery module increases in initial use, exerting negative influence such as area ratio reduction. The size of the length extended part 141 may be selected, taking this area ratio into account as much as possible, but it will be more desirable if the battery module is reused without changing the area ratio. The next embodiment relates to a method of reusing a battery module without increasing the electrode lead length.

Figure 9:
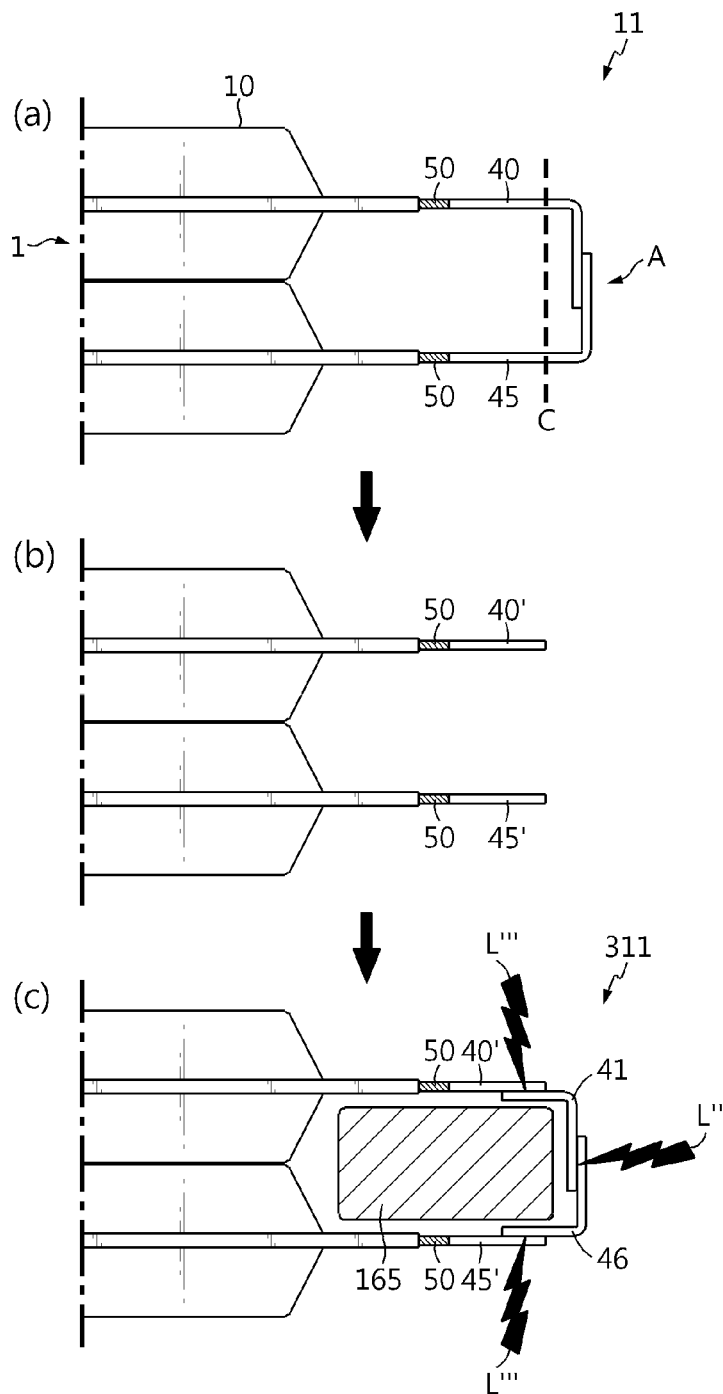
FIG. 9 is a side view illustrating a reuse method according to another embodiment of the present disclosure.

FIG. 9 is a side view illustrating a method of reusing a battery module according to another embodiment of the present disclosure.

Figure 2:
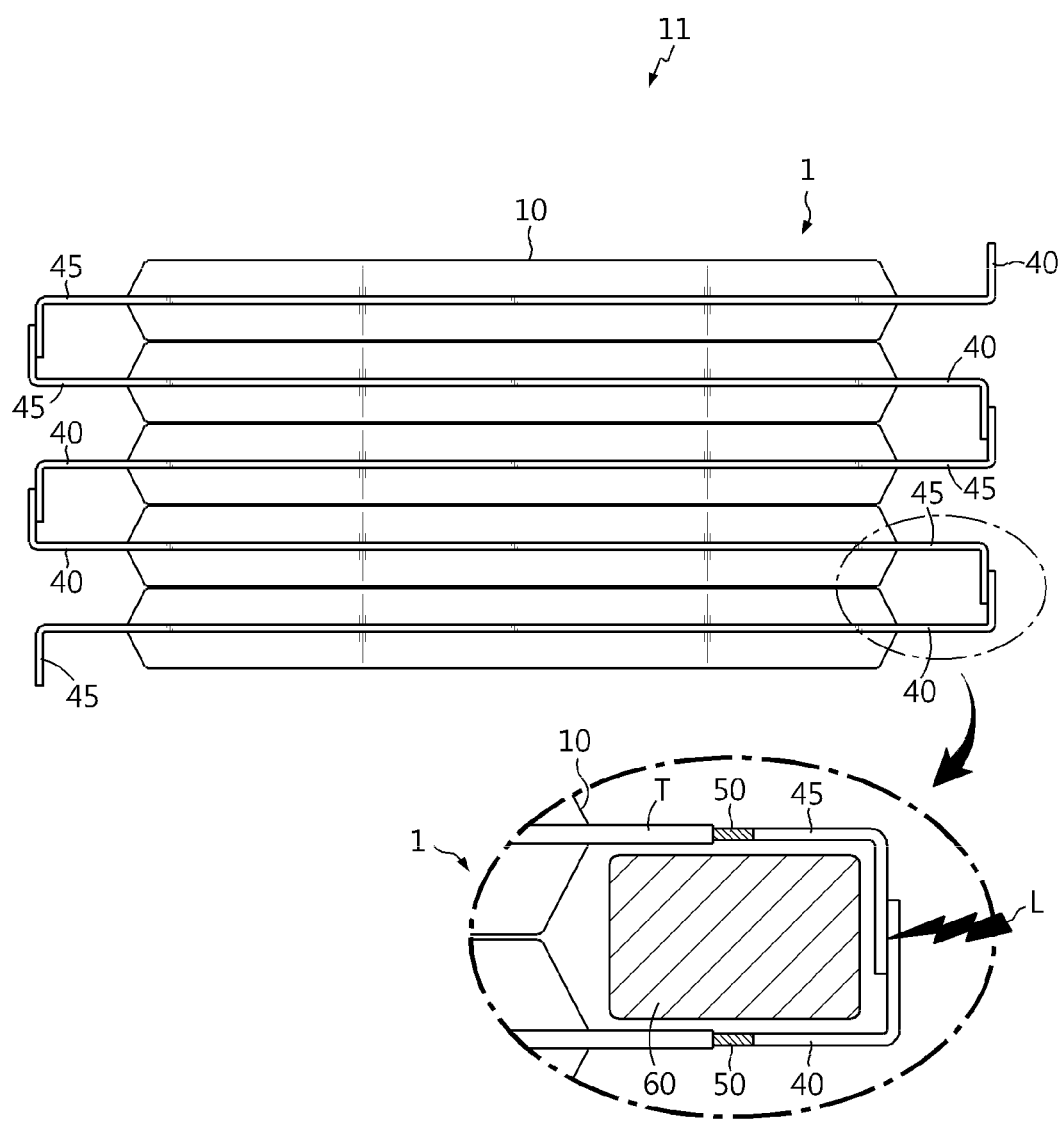
FIG. 2 is a side view of a conventional battery module.
Figure 3:
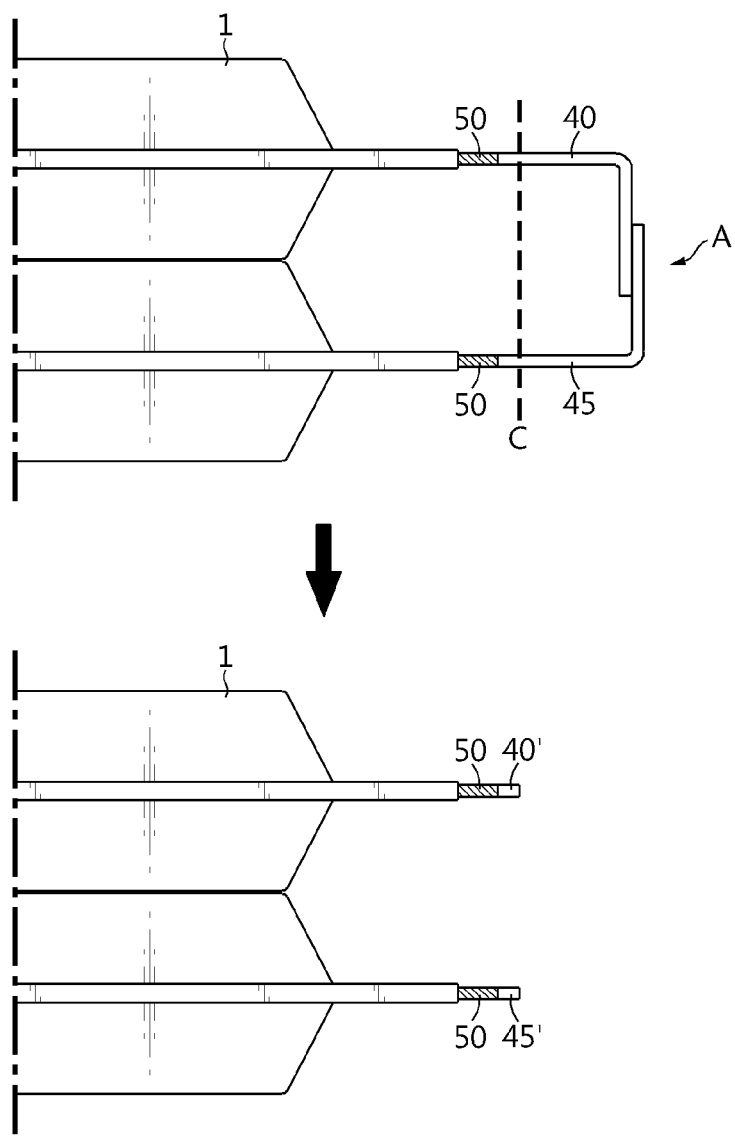
FIG. 3 is a diagram showing that it is difficult to reuse pouch type secondary batteries in a conventional battery module.

(a) of FIG. 9 shows side view of a battery module including conventional pouch type secondary batteries, for example, the general battery module 11 such as that shown in FIG. 2. After use of the battery module 11 as originally intended, the welded part A is cut along a line C into the state of (b). The remaining electrode leads 40', 45' are too short to use as they are. The present disclosure proposes welding L''' the additional leads 41, 46 for electrode lead length extension to the remaining electrode leads 40', 45' respectively. After extending the electrode lead length, referring to (c), for bending of the additional leads 41, 46, placement of the structure 165 and construction of a new battery module, welding L'' of the additional leads 41, 46 is performed to re-arrange and re-construct the pouch type secondary batteries 1 for reuse as a new battery module 311.

According to this embodiment, it is possible reuse the battery module without increasing the length of the electrode leads at the initial manufacture of the battery module. Rather, because a minimum length for welding the additional leads after cutting the welded part is required, it is more preferable to increase the electrode lead length even a little bit longer than those of commonly used general pouch type secondary batteries. When welding L''' the additional leads 41, 46 for electrode lead length extension to the remaining electrode leads 40', 45' respectively, many welding methods may be used, and when friction stir welding is used, it is advantageous because the weld width is less than 1 mm.

The friction stir welding is a welding method that heats and softens targets (in this embodiment, the additional leads 41, 46 and the remaining electrode leads 40', 45') by heat generated by friction by inserting a tool into the target and rotating the tool and stirring of the tool, leading to plastic flow, and welds the targets by the solid state joining, for example, welds the targets together at the joined area. The friction stir welding is a method that joins the additional leads 41, 46 and the remaining electrode leads 40', 45' in solid state without melting, and an advantage is that the characteristics of the welded part are better than fusion welding.

Figure 10:
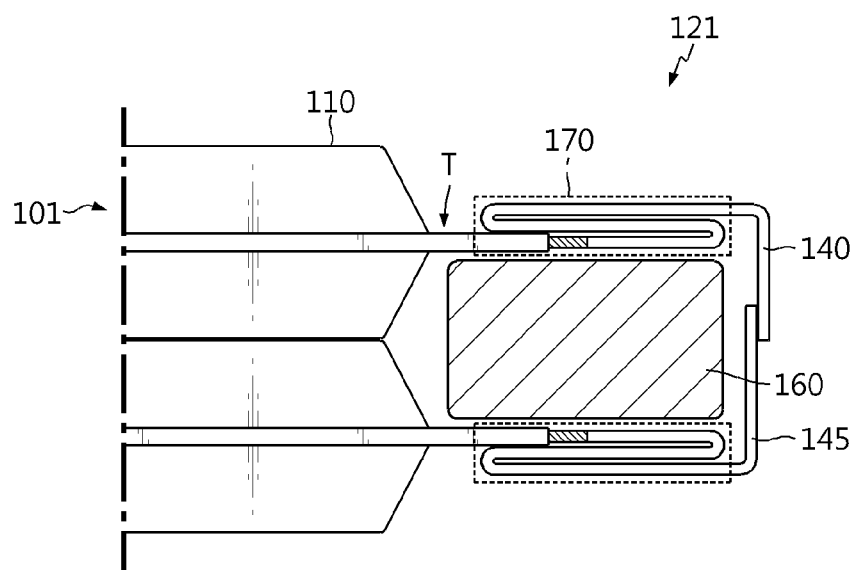
FIG. 10 is a side view of a battery module including pouch type secondary batteries according to still another embodiment of the present disclosure.

FIG. 10 is a side view of a battery module including pouch type secondary batteries according to still another embodiment of the present disclosure.

Referring to FIG. 10, in the same way as the first embodiment, this is a case of increasing the electrode lead length for reuse by connecting the pouch type secondary batteries with the remaining electrode lead part after cutting the welded part after use of the battery module.

That is, the pouch type secondary battery 101 described with reference to FIG. 4 is included in a battery module 121. The plurality of pouch type secondary batteries 101 is stacked, and two adjacent pouch type secondary batteries 101 are connected in series and/or in parallel such that the electrode leads 140, 145 provided in each pouch type secondary battery 101 are connected to each other to construct a battery module 121 with improved capacity and output. The reference numeral 160 is a structure that structurally supports the battery module 121, such as a molded product, in the same way as described previously.

The electrode leads 140, 145 are respectively welded to the positive electrode tab and the negative electrode tab of the electrode assembly and exposed through the pouch case 110. A portion where the electrode leads 140, 145 are drawn is called terrace T.

In this instance, this embodiment is characterized in that the length increased electrode leads 140, 145 are folded into the terrace T of the pouch type secondary battery 101 to reduce the horizontal length. To prevent a potential risk of a short circuit between the electrode leads 140, 145 that are folded and overlap with the terrace T, an insulation ensuring structure is needed, and is indicated by the reference numeral 170 in the drawing. As described previously, the insulation ensuring structure 170 may be formed by providing the length increased lead film 150 having the surplus part 151 or the insulation tape 155 and folding the electrode leads 140, 145 neatly, and winding another insulating tape after folding the electrode leads 140, 145. The battery module 121 with the structure of FIG. 10 may have a shape change or more complex shape of counterpart (for example, a cartridge, etc.) for fixing the pouch type secondary batteries 101 to fixedly receive the electrode leads 140, 145 folded into the terrace T in overlapping manner, but preferably ensures spatial utility/insulation/secondary utility possibility.

Figure 11:
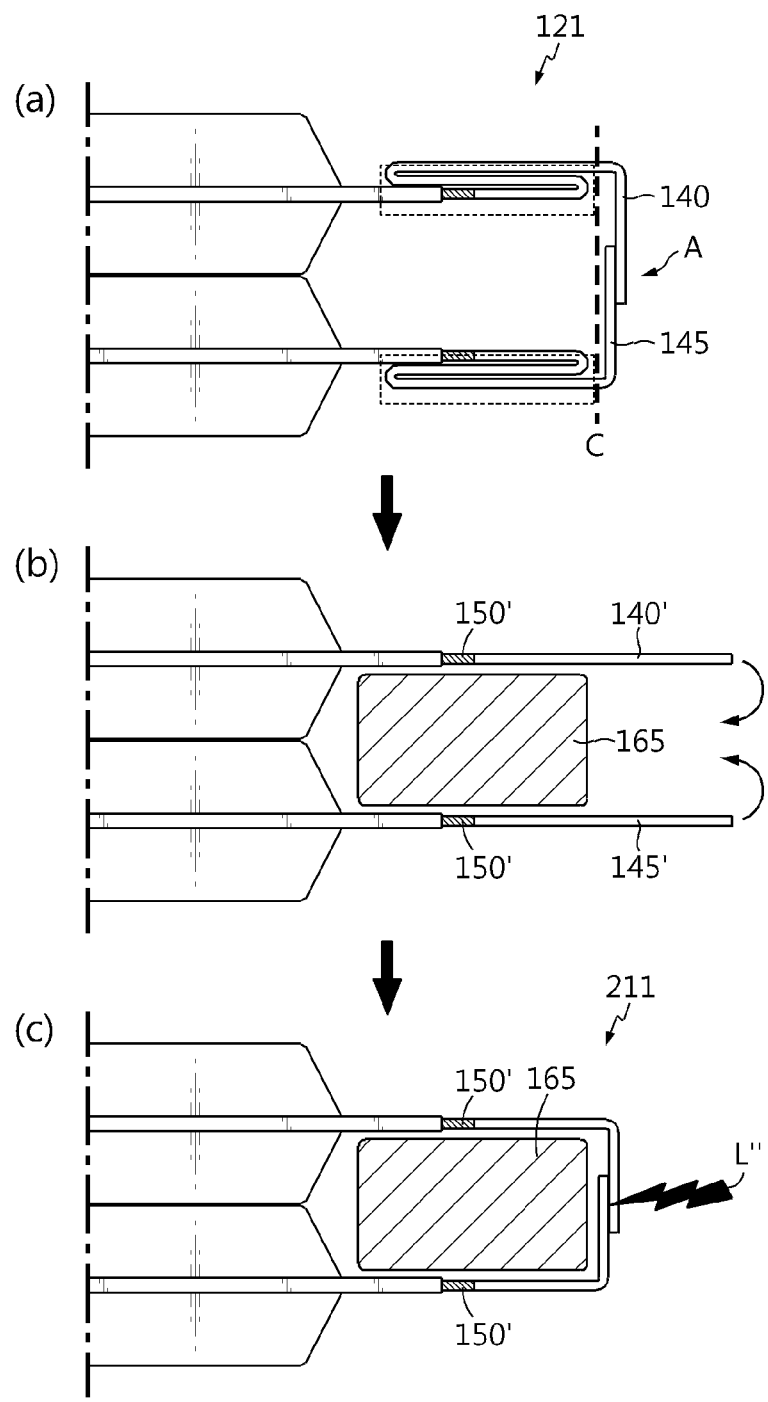
FIG. 11 is a side view illustrating a method of reusing the battery module of FIG. 10.

FIG. 11 is a side view illustrating a method of reusing the battery module of FIG. 10. After use of the battery module 121, the welded part A is cut along a line C as shown in (a), and the folded electrode leads are unfolded as shown in (b). Subsequently, the electrode leads 140', 145' are bent as shown in (c), and the structure 165 is placed and the electrode leads 140', 145' are welded L'' to re-arrange and re-construct the pouch type secondary batteries 101 for reuse as a new battery module 211.

Of course, the methods of reusing by combining or applying the previously described embodiments are available. As described above, according to the present disclosure, the insufficient electrode lead length problem encountered when reusing pouch type secondary batteries is solved, and a battery module of a new connection structure may be constructed irrespective of series/parallel connections structure.

As described above, the present disclosure proposes a method of reusing a battery module. The initial battery module is used, for example, as an electric vehicle battery, and after the intended service life expires, may be manufactured into another battery module by rearranging and re-welding pouch type secondary batteries through the reuse method proposed by the present disclosure. The newly manufactured battery module may be used for a second purpose, for example, an ESS having less strict capacity retention or other conditions than an electric vehicle battery. As described above, according to the present disclosure, it is possible to reuse without wasting the limited resources through the reuse of the battery module, and there are eco-friendly and cost effective advantages.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module comprising:
a plurality of stacked pouch type secondary batteries, each pouch type secondary battery having an electrode lead and a welded additional lead to provide an electrode lead length extension, respectively,
wherein the welded additional leads of adjacent pouch type secondary batteries are welded together,
wherein each electrode lead has a first surface and a second surface opposite the first surface, and
wherein each additional lead is bent to have an "L" shape defined by a first portion and a second portion, the first portion being welded to one of the first surface or the second surface of the electrode lead and the second portion being welded to the second portion of an adjacent additional lead.

2. The battery module according to claim 1, further comprising a molded structure located between the welded additional leads of the adjacent pouch type secondary batteries.

3. The battery module according to claim 2, wherein each pouch type secondary battery has a terrace, and
wherein the molded structure is overlapped by the terraces of the adjacent pouch type secondary batteries.

4. The battery module according to claim 1, wherein the welded additional lead and the electrode lead are joined by a solid state weld.

5. The battery module according to claim 4, wherein the solid state weld is formed by friction stir welding.

* * * * *